March 3, 1936.  B. WELLS  2,032,453
PRINTING PLATE
Filed July 28, 1934
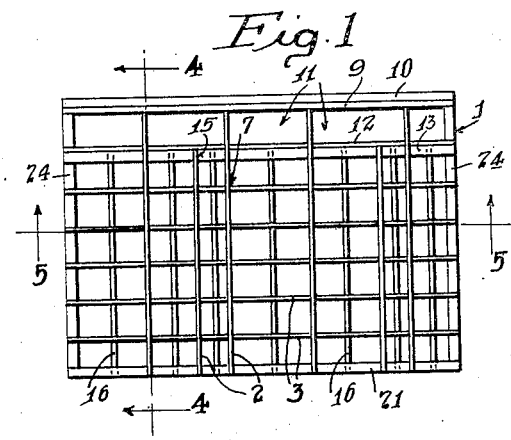
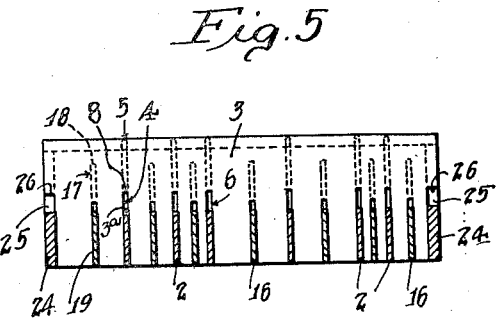
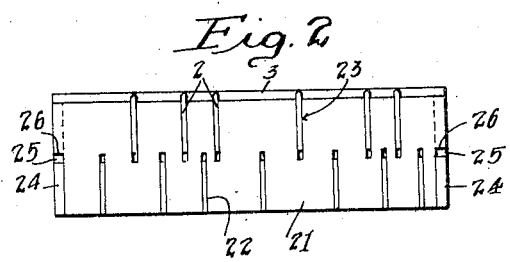
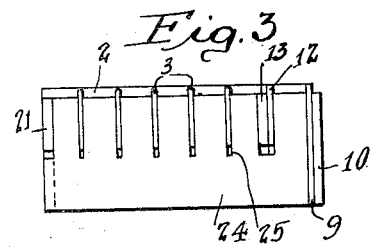
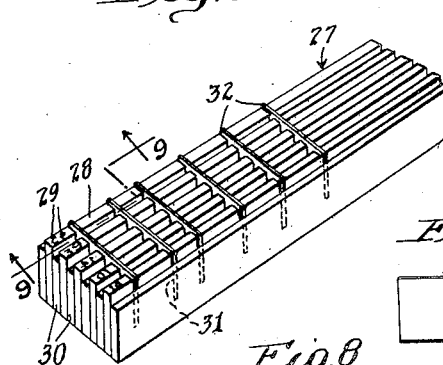
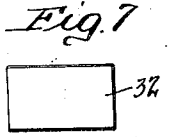
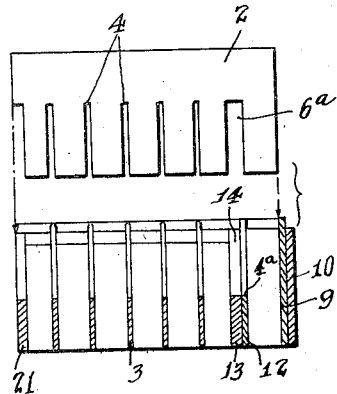
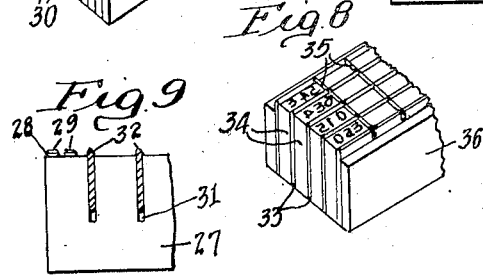
Inventor
Bruce Wells
By Lyon Lyon
Attorneys Patented Mar. 3, 1936

2,032,453

UNITED STATES PATENT OFFICE 2,032,453

PRINTING PLATE

Bruce Wells, Chicago, Ill.

Application July 28, 1934, Serial No. 737,414

2 Claims. (Cl. 101—400)

This invention relates to printing plates and particularly to a type of plate which is in the form of a block or frame for printing blanks, or sheets having blanks thereon, and divided into spaces for making entries. Such sheets are used largely in printed forms of all kinds, and for ledgers or other books in which entries must be made in columns.

Printing plates of this type have been constructed heretofore of two sets of transversely disposed printing rules, the printing rules of one set being notched or slotted at the intersection points with the other set, thereby forming a frame.

This frame was rendered rigid by employing a plastic material which was poured into the spaces between the rules toward the back of the plate or frame formed by the rules, and this plastic material then set in position, and when hard, made the frame rigid. The trade has not been generally favorable to the use of this frame rendered rigid by the use of the plastic material. It has also been attempted to overcome the necessity for employing a plastic material in the construction of such a plate by soldering or welding the joints or intersecting points between the transversely disposed rules, but there are such a great number of joints in a built-up plate of this kind that the use of the soldering or welding method is not commercially practical.

One of the difficulties in employing a printing plate of this kind is that when the inking rollers apply the ink to the printing edges of the rules it applies a lateral force to the rules and this force, being applied repeatedly, tends to warp or bend the rules out of line or out of their true planes.

The general object of this invention is to produce a printing plate of this type having a construction which renders the frame of the plate inherently rigid, avoiding the necessity for using any plastic material to render the plate rigid, and avoiding the necessity for the use of the tedious method of soldering or welding the joints. The avoidance of the use of solder or welding is particularly advantageous, because the frames upon the printing plate must be taken apart from time to time so as to use the rules in forming new plates.

A further object of the invention is to provide a construction for printing plates which will enable a rigid printing plate or block to be formed of the printing elements composing the plate or block which rigidly holds it against shifting.

Further objects of the invention will appear hereinafter.

The invention consists in the novel parts and combinations of parts to be described hereinafter, all of which contribute to produce an efficient printing plate.

A preferred embodiment of the invention is described in the following specifications, while the broad scope of the invention is pointed out in the appended claims.

In the drawing:

Figure 1 is a plan of a small printing plate embodying my invention.

Fig. 2 is an elevation of the lower end of the plate illustrated in Fig. 1.

Fig. 3 is an elevation showing the right side of the printing plate illustrated in Fig. 1.

Fig. 4 is a vertical cross section taken on the line 4—4 of Fig. 1, and illustrating one of the vertical printing rules in position to be slipped into place from above.

Fig. 5 is a horizontal section taken on the line 5—5 of Fig. 1, and further illustrating details of the printing plate.

Fig. 6 is a perspective illustrating another embodiment of the invention in which the printing plate is in the form of a solid block composed of rules laid face to face but in which the block is rendered rigid by the use of my invention.

Fig. 7 is a front elevation of one of the rules illustrated in Fig. 6, and representing the same as removed from the block illustrated in that figure.

Fig. 8 is a view similar to Fig. 6, but with the rear portion of the view broken away, and illustrating a block of the same type as that shown in Fig. 6 but in which two sets of intersecting printing rules are employed in forming the block. In the form shown in Fig. 6 only one set of printing rules is employed.

Fig. 9 is a fragmentary view and is a vertical section taken on the line 9—9 of Fig. 6.

In practicing the invention, I produce a printing plate having a set of parallel bars and having a set of transverse bars extending transversely to the first named set of bars; a set of said bars being provided with aligning slots cut therein and the other set of said bars lying in said slots and fitting tightly therein to form a rigid structure.

In one embodiment of the invention the rigid printing plate may be in the form of a block composed of a plurality of bars set face to face, certain of said bars constituting printing members spaced apart, if necessary, by intermediate bars These bars forming a block are then cut with aligning slots passing transversely through the same, and into these slots I force printing rules which fit tightly in the slots, thereby connecting the parallel bars into a rigid block which may be locked up in the printer's form or press. These printing rules extending transverse to the printing members will print parallel lines dividing the printed page into columns.

If desired, intermediate printing rules may be set between the printing members and extending transversely to the printing rules that form the column lines, thereby enabling the printed sheet to be printed with horizontal lines as well as vertical lines upon it.

In another embodiment of the invention the plate is in the form of a rigid frame, said frame being formed of two sets of intersecting bars, which bars preferably consist of printing rules. At their intersecting points these rules are formed of slots, and the slots of one set of printing rules interlock with the slots in the other set of printing rules. The printing rules are tight in the slots so that a rigid frame results, having rigid joints at the intersections of the printing rules. The rules must be formed of a material that is somewhat resilient and in order to utilize this resiliency to prevent any possibility of the plates being broken in forcing them into position, and to insure that the frame joints will maintain themselves tight for a considerable time, I form the interlocking slots in such way that the bottoms of the slots do not engage each other, and in this way a certain amount of material of each printing rule at the intersecting slots is left between the bottom of the slot in one rule and the adjacent edge of the rule that lies in that slot, and whose thickness is tending to wedge the slot to a slightly wider dimension than the slot has when it is cut.

On this account the slotted portions of the interlocking printing rules may be likened to a plurality of tongues formed by the slots, and placed in compression by the presence of the printing rules that lie in these slots. Of course by reason of this compression a very slight distortion in the plane of the tongue occurs; that is to say, the plane of the rule, but this is so slight it is not noticeable on the sheet printed from the plate.

Referring more particularly to the embodiment of the invention illustrated in Figs. 1 to 7, I indicates the complete printing plate. When in use this printing plate is locked up in a form or press in a manner well understood in the printing art. This plate comprises a set 2 of parallel printing bars or rules which may be referred to hereinafter as "vertical" rules because they are intended to print the vertical lines on the page that divide it into columns. The plate also includes a set of transverse bars preferably in the form of printing rules 3 which extend transversely to the vertical printing rules and which may be referred to hereinafter as "horizontal" rules because they will print the horizontal lines on the sheet.

At all the points of intersection of these two sets of rules, slots are formed, as will be now described, and the slots of one set are in alignment with each other so as to receive the adjacent edges at corresponding slots formed in the other set of rules.

In the present instance, as illustrated in Fig. 5, the vertical set of printing rules 2 are formed with aligned slots 4 that extend down into the same from their upper edges 5, and the transverse or horizontal printing rules 3 are formed with corresponding slots 6 which extend into the same from their lower edges. Both sets of printing rules are preferably of the same thickness and the slots are cut of somewhat scant width so that when the printing rules are interlocked with each other, as shown, a tight fit will occur at each intersecting joint 7, and in this way the material in each rule between the slots in it, is placed in compression; and this force is sufficient to insure that the rules will maintain themselves in their interlocked relation.

It will be noted, as illustrated in Fig. 5, that the bottom edges 8 of the slots 6 that are cut in the horizontal rules 3, are at a considerable distance from the bottom edges 3ª of the corresponding slots that are cut into the vertical printing rules 2. This leaves a considerable space between this bottom edge 8 and the bottom edge 3ª. This insures that none of the rules will be broken when they are set forcibly into position, and it also provides a narrow zone of metal between the distortion zone that is under compression and the portion of the rule that is not under compression stresses. This enhances the resilient action of the tongues between the slots and insures that the pressure of the slots on the sets of printing rules will be constantly maintained for a considerable time.

If it is desired to insert type at the upper end of the columns formed by the vertical rules 2, certain of these vertical rules may be extended across an upper zone so as to butt up against a header rule 9 outside of which a reenforcing rule 10 of considerable thickness is laid. In this way a plurality of pockets 11 are produced at the heads of the columns in which type plates or type may be set. In order to increase the rigidity of the upper frame 12, which is adjacent to the header rule 9, I prefer to provide a reenforcing rule 13 under it, as illustrated in Figs. 1 and 4, and this rule 13 is formed with a slot 14 cut down into the same from its upper edge and registering with the corresponding slot 4a that is cut down into the rule 12 from its upper edge. And each of the vertical rules 2 that extends up to the header rule 9 is formed with a special wide slot 6a cut into the same from its lower edge, which slot will straddle the superposed rules 12 and 13 and fit tightly onto the same. The reenforcing rule 13 is formed with additional vertical slots 15 to receive the upper ends of the vertical printing rules 2 that do not extend beyond the upper rule 2. These reenforcing rules 10 and 13 give sufficient rigidity to the two top rules 9 and 12 to insure that a type plate can be wedged up in the spaces 11 so that it will be held rigidly in the complete printing plate.

In a printing plate of this kind it is found in practice that if the printing rules are spaced at too great a distance apart then the rules transverse to the same may have a tendency to be bent out of line from repeated contacts with the printing roller. For this purpose it may be desirable to employ brace bars placed intermediately between the printing rules.

In Fig. 1 I illustrate this feature of the invention, in which "vertical" brace bars 16 are placed parallel with the vertical rules 2. These brace bars or brace rules 16 are illustrated clearly in Fig. 5. They have slots 17 cut into them from their upper edges 18 and their upper edges 18 are depressed below the level of the printing edges 5 of the rules 2, which, of course, have the same level as the upper edges of the transverse rules 3.

The transverse rules 3 have slots 19 cut into the same from their lower edges to engage with the slots 17 cut down into the upper edges of the brace rules 16, to interlock with the slots 17. These rules are tight on each other when they interlock, like the other joints 7 of the printing plate.

The complete plate 1 includes a bottom rule 21 (see Figs. 1, 2 and 4) which is provided with slots 22 extending up into the same from its lower edge and slots 23 extending down into the same from its upper edge, and these slots receive the ends of the vertical rules 2 and also the ends of the vertical brace rules 16. The rule 13 is preferably provided with similar slots, and these slots are all of scant width so as to insure that the ends of the vertical rules that fit into them will be tight.

By reason of the fact that the bottoms of the notches that interlock at the joints 7 in this printing plate are not in contact with each other, it follows that both sets of rules, which have their bottom edges in the same plane, bear directly against the upper face of the platen on which the printing plate is set up for printing.

The printing plate also includes side bars 24 which are of increased thickness like the reenforcing rules 10 and 13, and the upper edges of these side bars or side rules are formed with slots 25 (see Fig. 3) which receive tightly the ends of the horizontal rules 3 which are rabbeted into the same, as indicated in Fig. 5. At the corners of the printing plate these side bars 24 form mortise joints, such as the mortise joint 26 illustrated in Fig. 2, between them and the cross bars 10 and 21.

It will be evident that the complete printing plate illustrated in Fig. 1 can be readily locked up in a printing chase, using rules or furniture lying up against the outside bars of the complete frame.

In the embodiment of the invention illustrated in Fig. 6, the printing plate or frame is in the form of a block 27 composed of a plurality of printing members or printing bars 28 in the form of type plates or rules with raised type 29 which are "type-high". These printing members 28 are spaced apart by spacer plates or rules 30 placed between the same, and which are of less height than the printing members 28. This assembly of plates is set up in a machine and the plates or rules composing this block are cut through to form transverse slots 31 which extend down a considerable distance into the plates or rules from their upper edges, I now employ a plurality of printing rules 32 that are of sufficient thickness to be tight in these slots 31, and I then press these printing rules 32 forcibly down into the slots. The slots 31 are cut sufficiently deep to permit this, and when seated the upper rule edges will be at the printing plane. Fig. 7 illlustrates one of these rules 32 removed from the block.

The block as formed in Fig. 6 only provides for vertical column lines. If desired, however, I may provide intermediately placed "horizontal" rules 33, as illustrated in Fig. 8, located between the printing members or bars 34. These printing rules 33 are set up to form a block with the bars 34 and this block is slotted to form slots similar to the slots 31 illustrated in Fig. 6. Into these slots vertical rules 35 are forced tightly. In both of these block forms, outside plates, such as plates 36 (illustrated in Fig. 8) may be placed adjacent the outside printing members and these outside bars or rules are of course of less height than the printing members.

Referring again to the embodiment of the invention illustrated in Figs. 1 to 4, it should be noted also that the bars 10, 13, 24 and 25 are all of less width than the printing rules. This brings their upper edges below the printing plane so that there is no danger of their being engaged by the inking rollers.

It is understood that the embodiments of the invention described herein are only some of the many embodiments this invention may take, and I do not wish to be limited in the practice of the invention, nor in the claims, to the particular embodiments set forth.

What I claim is:

1. A printing plate in the form of a frame having a set of parallel spaced printing rules with aligning slots cut into the upper edges thereof, and having a second set of transverse spaced printing rules extending transversely to the first-named set of rules, and having aligned slots cut upwardly into the same from their lower edges, said rules being formed of resilient material, the slots of one set of printing rules interlocking with the slots of the other set of printing rules to form joints, and said rules fitting tightly in the slots to form rigid joints and a rigid frame in which the rules are held rigidly in place throughout their entire length, and a set of brace bars extending parallel with one of the sets of rules, and having slots aligning with the other set of printing rules, said other set of printing rules having slots interlocking with the slots of the brace bars and fitting tightly therein to form rigid joints.

2. A printing plate in the form of a frame having a set of parallel spaced printing rules with aligning slots cut into the upper edges thereof, and having a second set of transverse spaced printing rules extending transversely to the first-named set of rules, and having aligned slots cut upwardly into the same from their lower edges, said rules being formed of resilient material, the slots of one set of printing rules interlocking with the slots of the other set of printing rules to form joints, and said rules fitting tightly in the slots to form rigid joints and a rigid frame, and a set of brace bars extending parallel with one of the sets of rules, and having slots aligning with the other set of printing rules, said other set of printing rules having slots interlocking with the slots of the brace bars and fitting tightly therein to form rigid joints, the slots in said brace bars extending into the same from their upper edges, and the slots in the printing rules for receiving the brace bars extending to the same from their lower edges, said parts cooperating to form a rigid printing plate in which the joints operate to hold all of the members forming the printing plate against lateral displacement.

BRUCE WELLS.